(12) United States Patent
Kishine et al.

(10) Patent No.: US 11,288,780 B2
(45) Date of Patent: Mar. 29, 2022

(54) IMAGING APPARATUS

(71) Applicant: FUJIFILM Corporation, Tokyo (JP)

(72) Inventors: Yasunobu Kishine, Saitama (JP); Daiki Komatsu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/891,097

(22) Filed: Jun. 3, 2020

(65) Prior Publication Data
US 2020/0294210 A1 Sep. 17, 2020

Related U.S. Application Data

(63) Continuation of application No. PCT/JP2018/046789, filed on Dec. 19, 2018.

(30) Foreign Application Priority Data

Dec. 26, 2017 (JP) .............................. JP2017-249069

(51) Int. Cl.
G06T 5/10 (2006.01)
G06T 5/00 (2006.01)
G03B 17/14 (2021.01)

(52) U.S. Cl.
CPC .............. G06T 5/006 (2013.01); G03B 17/14 (2013.01); G06T 5/10 (2013.01)

(58) Field of Classification Search
CPC .......... G06T 5/006; G06T 5/10; G03B 17/14; H04N 5/22541; H04N 5/232; G02B 15/10; G02B 15/12
See application file for complete search history.

(56) References Cited

U.S. PATENT DOCUMENTS 5,564,811 A 10/1996 Lim
8,243,353 B1 * 8/2012 Gutin ................... G03H 1/2286
                                                       359/21
(Continued)

FOREIGN PATENT DOCUMENTS

CN          1116727          2/1996
CN        101715052          5/2010
(Continued)

OTHER PUBLICATIONS

Li Jingzhen, "VI. Coding Hole Imaging",with English concise explanation of relevance, Optics Manual, Jul. 31, 2010, pp. 1-6.
(Continued)

Primary Examiner — Nay A Maung
Assistant Examiner — Kathleen M Broughton
(74) Attorney, Agent, or Firm — JCIPRNET

(57) ABSTRACT

An object of the present invention is provide a coded aperture imaging apparatus that has a refocusing function and can change an angle of view. An imaging apparatus includes an imaging apparatus main body including a coded aperture, an imaging element that outputs a signal indicating a projected image of a subject, and an image restoration unit that reconstructs an image of a spatial domain based on the signal, and a lens attached to the imaging apparatus main body on a subject side from the coded aperture and changes an imaging angle of view in a state where the lens is attached to the imaging apparatus main body with respect to an imaging angle of view in a state where the lens is not attached to the imaging apparatus main body, in which the projected image is formed on the imaging element by the lens and the coded aperture.

19 Claims, 17 Drawing Sheets

(56) References Cited

U.S. PATENT DOCUMENTS

| | | |
|---|---|---|
| 10,423,002 B2 | 9/2019 | Shimano |
| 2007/0139777 A1 | 6/2007 | Williams et al. |
| 2008/0187305 A1 | 8/2008 | Raskar et al. |
| 2010/0033730 A1* | 2/2010 | Kim .................. G01B 9/02083 356/479 |
| 2010/0085468 A1 | 4/2010 | Park et al. |
| 2011/0037832 A1 | 2/2011 | Gharib et al. |
| 2011/0079725 A1* | 4/2011 | Tobin, Jr ................. G01T 1/295 250/363.06 |
| 2012/0105588 A1* | 5/2012 | Yamamoto ......... H04N 5/23296 348/46 |
| 2013/0107002 A1 | 5/2013 | Kikuchi |
| 2015/0341560 A1 | 11/2015 | Ishihara |
| 2016/0316142 A1* | 10/2016 | Sangu .................. G02F 1/13306 |
| 2019/0339485 A1 | 11/2019 | Nakamura et al. |
| 2019/0361257 A1 | 11/2019 | Shimano |

FOREIGN PATENT DOCUMENTS

| | | | |
|---|---|---|---|
| CN | 101799590 | | 8/2010 |
| CN | 204993599 U | * | 1/2016 |
| CN | 105929560 | | 9/2016 |
| CN | 105981363 | | 9/2016 |
| JP | 2008191661 | | 8/2008 |
| JP | 2013093754 | | 5/2013 |
| JP | 2014131109 | | 7/2014 |
| JP | 2014197002 | | 10/2014 |
| JP | 2015133594 | | 7/2015 |
| JP | 2016123467 A | * | 7/2016 |
| JP | 2016165070 | | 9/2016 |
| WO | WO-9745755 A1 | * | 12/1997 ............ G01N 23/22 |
| WO | 2016203573 | | 12/2016 |
| WO | 2017149687 | | 9/2017 |

OTHER PUBLICATIONS

Office Action of China Counterpart Application, with English translation thereof, dated Mar. 4, 2021, pp. 1-19.

"International Search Report (Form PCT/ISA/210) of PCT/JP2018/046789," dated Feb. 19, 2019, with English translation thereof, pp. 1-5.

"International Preliminary Report on Patentability (Form PCT/IPEA/409) of PCT/JP2018/046789," completed on Sep. 18, 2019, with English translation thereof, pp. 1-10.

Yusuke Nakamura, et al., "Lensless Light-field Imaging with Fresnel Zone Aperture," Technical Report of the Institute of Image Information and Television Engineers, vol. 40, Nov. 2016, pp. 1-6.

Hitachi, Ltd., "Development of lensless camera technology enabling easy focus adjustment after motion picture imaging," searched on May 8, 2017, Available at: http://www.hitachi.co.jp/New/cnews/month/2016/11/1115.html.

"Office Action of China Counterpart Application" with English translation thereof, dated Oct. 8, 2021, p. 1-p. 9.

\* cited by examiner

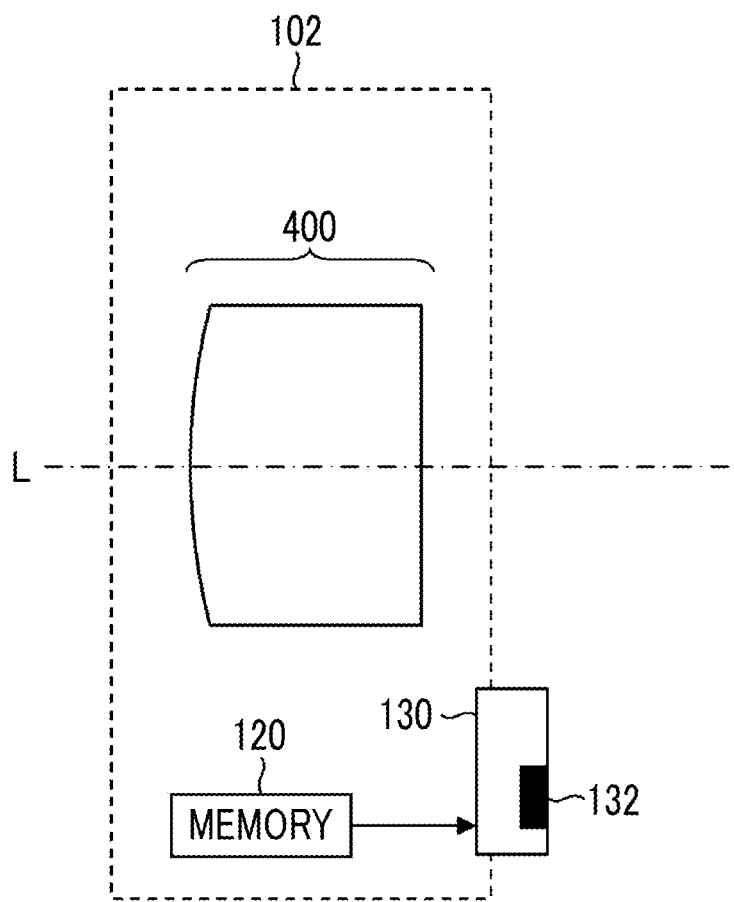

FIG. 3A
FIG. 3B
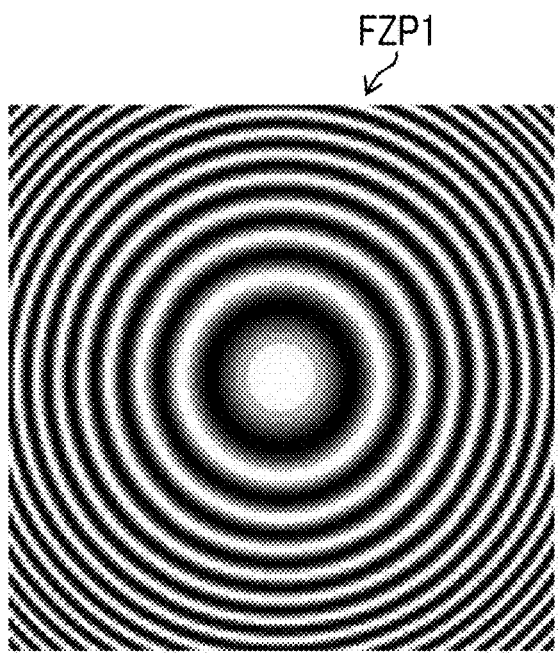
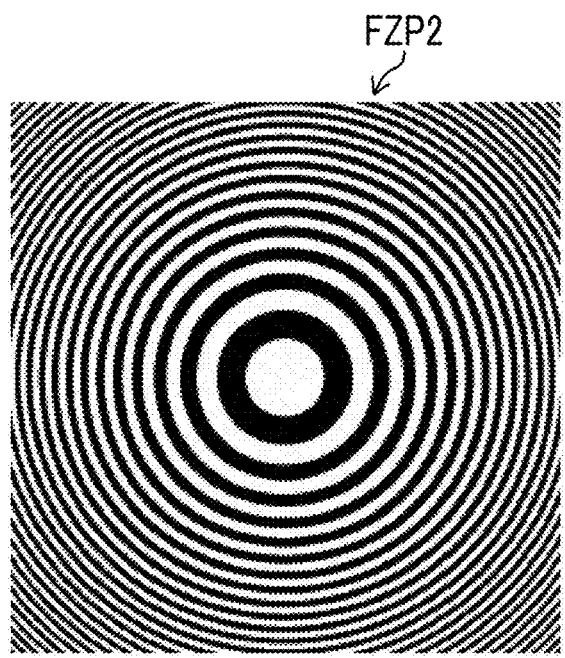

FIG. 8A

| SURFACE NUMBER | RADIUS OF CURVATURE | SURFACE INTERVAL | n | ν |
|---|---|---|---|---|
| 1 | 9.13137 | 0.0801 | 1.74785 | 36.55 |
| 2 | 1.47795 | 0.4004 | | |
| *3 | −25.35311 | 0.1201 | 2.01552 | 15.23 |
| *4 | 0.69669 | 0.6846 | | |
| *5 | 1.14946 | 0.3227 | 1.51834 | 53.01 |
| *6 | 3.33560 | 0.0859 | | |
| 7 | 1.40890 | 0.3091 | 1.51112 | 64.88 |
| 8 | −4.64394 | 0.2675 | | |
| 9 (PUPIL) | ∞ | 1.0000 | | |

FIG. 8B

| SURFACE NUMBER | RADIUS OF CURVATURE | SURFACE INTERVAL | n | ν |
|---|---|---|---|---|
| 1 | 1.58373 | 0.8807 | 1.69843 | 56.96 |
| 2 | 2.25903 | 0.1974 | | |
| 3 | 6.71884 | 0.0799 | 1.80756 | 25.24 |
| 4 | 2.28969 | 0.2499 | 1.80397 | 48.24 |
| 5 | 1.46052 | 0.3996 | | |
| 6 | 14.19519 | 0.1107 | 1.80755 | 25.24 |
| 7 | −13.44247 | 0.3414 | | |
| 8 (PUPIL) | ∞ | 1.0000 | | |

FIG. 9

| | SURFACE NUMBER | | | |
|---|---|---|---|---|
| | 3 | 4 | 5 | 6 |
| KA | 1.000000000E+00 | 1.000000000E+00 | 1.000000000E+00 | 1.000000000E+00 |
| A4 | 5.087533358E-01 | -6.485457670E-01 | 1.462242424E-02 | 3.855409200E-01 |
| A6 | 1.183764180E-01 | -6.487514710E-01 | -1.453480780E+00 | -8.804300620E-01 |
| A8 | 2.223434863E+00 | -3.029918630E+01 | -7.262484160E+01 | 2.017575810E+01 |
| A10 | -1.230547610E+01 | 1.541659210E+02 | -6.377168180E+02 | -1.921798790E+03 |
| A12 | -2.003025140E+01 | -7.369037110E+02 | 1.680812620E+03 | 9.687636020E+02 |
| A14 | -1.866688120E+02 | -4.472355980E+03 | 4.428928590E+03 | -5.117184820E+04 |
| A16 | -1.112683480E+03 | 7.131023540E+03 | 1.645125750E+06 | -1.899656980E+06 |
| A18 | -6.243516410E+03 | -1.730859030E+03 | -7.870123640E+07 | -1.848145060E+06 |
| A20 | 4.220492970E+04 | -5.564531750E+06 | 8.429473460E+06 | -5.042287420E+06 |

FIG. 10B

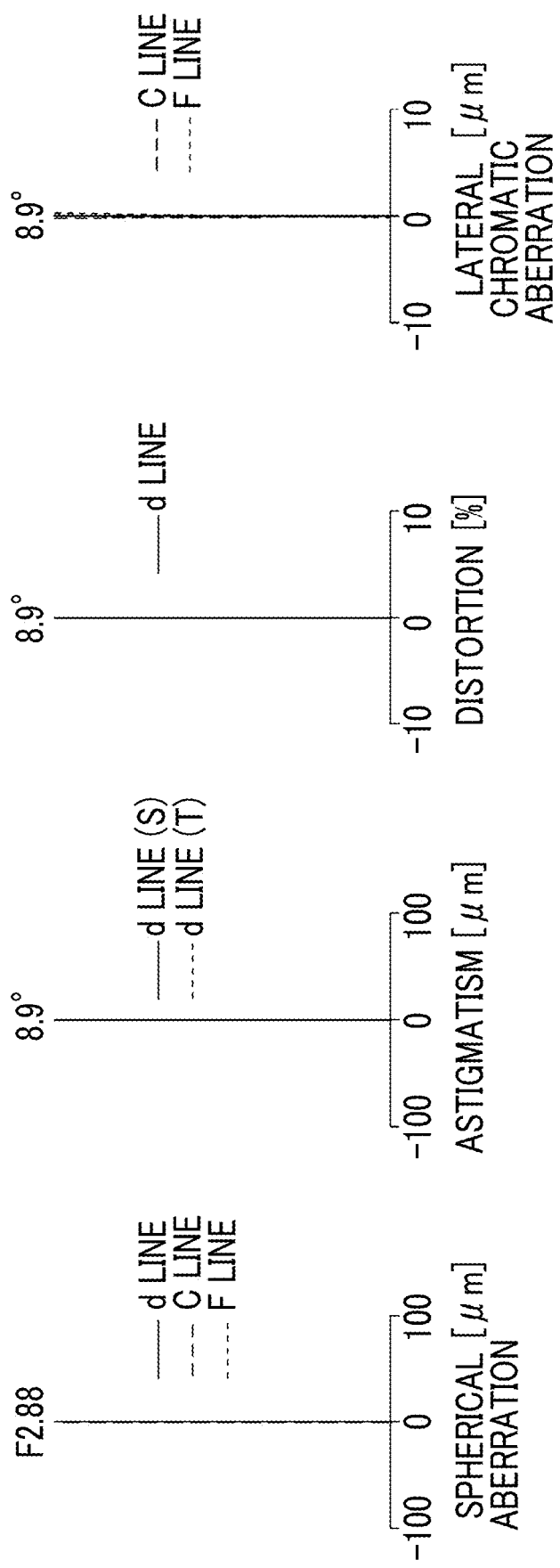

FIG. 12

|  | EXAMPLE 1 | EXAMPLE 2 |
|---|---|---|
| f' | 0.32 | 1.4 |
| F No. | 2.88 | 2.88 |
| 2ω [deg] | 60.0 | 17.8 |
| ANGLE OF VIEW [deg] OF ORIGINAL OPTICAL SYSTEM | 20.6 | 24.8 |

FIG. 13

| CONDITIONAL EXPRESSION | EXAMPLE 1 |
|---|---|
| Ms/Cs | 1.106 |
| \|Ff/DA\| | 0.662 |
| Mt/Ct | 2.547 |
| \|WCTL/WCf\| | 0.0063 |
| \|Dist\| | 2.23 |
| Ms | 0.0613 |
| Cs | 0.0554 |
| Ff | −0.4529 |
| DA | 0.6846 |
| Mt | 0.1411 |
| Ct | 0.0554 |
| WCTL | 2.003 |
| WCf | 317.5 |

FAR ←——————————→ CLOSE

IMAGING APPARATUS

CROSS-REFERENCE TO RELATED APPLICATIONS

This application is a Continuation of PCT International Application No. PCT/JP2018/046789 filed on Dec. 19, 2018, which claims priority under 35 U.S.C § 119(a) to Japanese Patent Application No. 2017-249069 filed on Dec. 26, 2017. Each of the above application(s) is hereby expressly incorporated by reference, in its entirety, into the present application.

BACKGROUND OF THE INVENTION

1. Field of the Invention

The present invention relates to an imaging apparatus comprising a coded aperture.

2. Description of the Related Art

In recent years, technologies for acquiring an image of a subject without a lens have been developed. For example, in "Development of lensless camera technology enabling easy focus adjustment after motion picture imaging", [online], Nov. 15, 2016, Hitachi, Ltd., [searched on May 8, 2017], Internet (http://www.hitachi.co.jp/New/cnews/month/2016/11/1115.html), a Fresnel zone plate is arranged near an imaging element, and the image of the subject can be acquired without a lens by performing Fourier transformation on a moire fringe generated by superimposing a projected image formed on the imaging element by light from the subject with a projected pattern corresponding to the Fresnel zone plate. The technology in "Development of lensless camera technology enabling easy focus adjustment after motion picture imaging", [online], Nov. 15, 2016, Hitachi, Ltd., [searched on May 8, 2017], Internet (http://www.hitachi.co.jp/New/cnews/month/2016/11/1115.html) is also disclosed in "Lensless Light-field Imaging with Fresnel Zone Aperture", Technical Report of The Institute of Image Information and Television Engineers, vol. 40, no. 40, IST2016-51, pp. 7-8, November 2016.

In addition, a lensless imaging technology for using the Fresnel zone plate in the mask pattern like in "Development of lensless camera technology enabling easy focus adjustment after motion picture imaging", [online], Nov. 15, 2016, Hitachi, Ltd., [searched on May 8, 2017], Internet (http://www.hitachi.co.jp/New/cnews/month/2016/11/1115.html) and "Lensless Light-field Imaging with Fresnel Zone Aperture", Technical Report of The Institute of Image Information and Television Engineers, vol. 40, no. 40, IST2016-51, pp. 7-8, November 2016 is known (refer to WO2016/203573A). In WO2016/203573A, an image of a subject is reconstructed by performing Fourier transformation on a moire fringe that is formed by light from the subject incident on two grating patterns (Fresnel zone plates) arranged opposite to each other.

SUMMARY OF THE INVENTION

In the technology disclosed in "Development of lensless camera technology enabling easy focus adjustment after motion picture imaging", [online], Nov. 15, 2016, Hitachi, Ltd., [searched on May 8, 2017], Internet (http://www.hitachi.co.jp/New/cnews/month/2016/11/1115.html) and "Lensless Light-field Imaging with Fresnel Zone Aperture", Technical Report of The Institute of Image Information and Television Engineers, vol. 40, no. 40, IST2016-51, pp. 7-8, November 2016 and WO2016/203573A, refocusing is available, and the focal length is $f=2\times\beta\times d$. The refocusing is focusing afterward to a desired focusing distance by reconstructing the image. Here, $\beta$ denotes the pitch of the Fresnel zone plate, and d denotes the interval between an image sensor and the Fresnel zone plate. In the case of changing an angle of view (focal length) in the imaging apparatus having such a configuration, the pitch and/or position of the Fresnel zone plate is changed. The change causes the following disadvantages.

For example, in the case of setting a wide angle state (decreasing the focal length), it is necessary to "(1) increase the pitch of the Fresnel zone plate" or "(2) bring the Fresnel zone plate close to the sensor (decrease the value of d)". In the case of (1), the number of streaks which correspond to a pattern configured with a region transmitting light and a region blocking light in the Fresnel zone plate is decreased, and thus, optical resolution of the angle of view (resolution) is decreased. In the case of (2), as the Fresnel zone plate is brought close to the image sensor, requirements for positional accuracy of the Fresnel zone plate and the image sensor are increased. Meanwhile, in the case of setting a telephoto state (increasing the focal length), it is necessary to "(3) decrease the pitch of the Fresnel zone plate" or "(4) separate the Fresnel zone plate from the image sensor (increase the value of d)". In the case of (3), the pitch needs to be decreased, and thus, the level of difficulty in manufacturing is increased. In the case of (4), the image of the Fresnel zone plate on the image sensor is blurred by diffraction of light, and the image quality of the reconstructed image is decreased.

In the technology of the related art, it is difficult to change the angle of view while maintaining a refocusing function in the imaging apparatus including the coded aperture.

The present invention is conceived in view of such a matter, and an object thereof is to enable an angle of view to be changed while maintaining a refocusing function in an imaging apparatus including a coded aperture.

In order to achieve the object, an imaging apparatus according to a first aspect of the present invention comprises an imaging apparatus main body including a coded aperture, an imaging element that outputs a signal indicating a projected image of a subject, and an image restoration unit that reconstructs an image of a spatial domain based on the signal, and a lens that is attached to the imaging apparatus main body on a subject side from the coded aperture and changes an imaging angle of view in a state where the lens is attached to the imaging apparatus main body with respect to an imaging angle of view in a state where the lens is not attached to the imaging apparatus main body, in which the projected image is formed on the imaging element by causing light from the subject to be transmitted through the lens and the coded aperture.

The imaging apparatus according to the first aspect has the refocusing function provided by the coded aperture and furthermore, can change the angle of view by mounting the lens.

In the first aspect, for example, a pinhole, a plurality of apertures arranged in two-dimensional directions, a Fresnel zone plate, or a coded mask in the form of a two-dimensional barcode can be used as the coded aperture (it is assumed that the properties of these coded apertures such as a number, a position, a size, a shape, and an arrangement interval are known). In addition, the coded aperture can be arranged at the position of a pupil (stop) of the lens. The angle of view of the lens attached to the imaging apparatus main body may be fixed, or a lens such as a zoom lens that can change the angle of view may be used.

An imaging apparatus according to a second aspect is such that in the first aspect, the lens is a lens that does not decrease an edge part light quantity in a state where the lens is attached to the imaging apparatus main body below an edge part light quantity in a state where the lens is not attached to the imaging apparatus main body. According to the second aspect, the lens does not decrease the edge part light quantity. Thus, an image having favorable image quality can be obtained.

An imaging apparatus according to a third aspect is such that in the first or second aspect, the lens is a lens that increases the imaging angle of view in a state where the lens is attached to the imaging apparatus main body above the imaging angle of view in a state where the lens is not attached to the imaging apparatus main body. The lens in the third aspect is a so-called "wide conversion lens", and imaging can be performed at a wider angle of view than a case where the lens is not attached.

An imaging apparatus according to a fourth aspect is such that in the first aspect, the lens is a lens that decreases the imaging angle of view in a state where the lens is attached to the imaging apparatus main body below the imaging angle of view in a state where the lens is not attached to the imaging apparatus main body. The lens in the fourth aspect is a so-called "tele conversion lens", and imaging can be performed in a more telephoto state than a case where the lens is not attached.

An imaging apparatus according to a fifth aspect is such that in any one of the first to fourth aspects, the lens is an interchangeable lens that is attached to or detached from the imaging apparatus main body. According to the fifth aspect, imaging can performed under a desired condition by mounting (attaching) lenses having different angles of view and focal lengths depending on an imaging purpose and an imaging condition.

An imaging apparatus according to a sixth aspect is such that in any one of the first to fifth aspects, the imaging apparatus main body includes a lens attachment port to which the lens is attached on the subject side from the coded aperture. In the sixth aspect, for example, a mount, a screw thread, or a screw groove can be exemplified as the lens attachment port. However, the present invention is not limited thereto.

An imaging apparatus according to a seventh aspect is such that in any one of the first to sixth aspects, the image restoration unit corrects aberration caused by the lens in the image of the spatial domain. In the seventh aspect, the aberration caused by the lens is corrected. Thus, an image having favorable image quality can be obtained. The correction of the aberration may be performed before reconstructing the image or may be performed after reconstruction. In the case of correcting the aberration before reconstruction, for example, the correction may be performed by changing the shape and/or the size of the coded aperture to be multiplied with the projected image depending on the type and/or the amount of aberration to be corrected. Meanwhile, in the case of correcting the aberration after reconstruction, for example, the correction can be performed by performing image processing such as applying different filters (for example, filters for point image restoration) depending on the type and/or the degree of aberration to be corrected and a condition such as a position in the image. However, the correction of the aberration in the present invention is not limited to such an aspect.

An imaging apparatus according to an eighth aspect is such that the imaging apparatus in the seventh aspect further comprises a lens information acquisition unit that acquires information about the lens, in which the image restoration unit corrects the aberration based on the acquired information. According to the eighth aspect, the aberration can be accurately and easily corrected based on the information about the lens. A lens information storage unit that stores the information about the lens may be comprised in the lens, and the lens information acquisition unit may acquire the information from the lens information storage unit. The lens information storage unit can be configured using a non-transitory recording medium.

An imaging apparatus according to a ninth aspect of the present invention is such that in any one of the first to eighth aspects, the coded aperture is a Fresnel zone plate, and the image restoration unit generates a multiplied image by multiplying the projected image formed on the imaging element by the Fresnel zone plate with a Fresnel zone pattern corresponding to the Fresnel zone plate and reconstructs the image of the spatial domain by performing Fourier transformation on the multiplied image. The ninth aspect prescribes a specific aspect of image reconstruction.

An imaging apparatus according to a tenth aspect is such that in the ninth aspect, the Fresnel zone pattern includes a first Fresnel zone pattern and a second Fresnel zone pattern that has the same local spatial frequency in each region as the first Fresnel zone pattern and has different phases of the local spatial frequency, and the image restoration unit generates a complex image composed of an image of a real part and an image of an imaginary part as the multiplied image by multiplying the projected image with each of the first Fresnel zone pattern and the second Fresnel zone pattern and reconstructs the image of the spatial domain by performing two-dimensional complex Fourier transformation on the complex image. The tenth aspect prescribes another specific aspect of image reconstruction. Thus, a reconstructed image having favorable image quality without an overlap of a subject image can be obtained. In the tenth aspect, a shift in phase between the first Fresnel zone pattern and the second Fresnel zone pattern is preferably greater than or equal to 70 degrees and less than or equal to 110 degrees. An image having further favorable image quality is obtained as long as the shift in phase is in this range.

An imaging apparatus according to an eleventh aspect of the present invention is such that in the tenth aspect, the image restoration unit generates the complex image by using the first Fresnel zone pattern and the second Fresnel zone pattern having different magnification ratios depending on a subject distance to be focused. According to the eleventh aspect, by using the Fresnel zone patterns having different magnification ratios depending on the subject distance to be focused, an image that is focused to a desired subject distance can be obtained.

An imaging apparatus main body according to a twelfth aspect of the present invention is an imaging apparatus main body comprising a coded aperture, an imaging element that outputs a signal indicating a projected image of a subject projected by causing light from the subject to be transmitted through the coded aperture, and an image restoration unit that reconstructs an image of a spatial domain based on the signal, in which the imaging apparatus main body includes a lens attachment port to which a lens is attached on a subject side from the coded aperture, and a lens information acquisition unit that acquires lens information about the lens, and the image restoration unit corrects aberration caused by the lens in the image of the spatial domain.

As described above, according to the imaging apparatus of the present invention, it is possible to change the angle of view while maintaining the refocusing function provided by the coded aperture.

BRIEF DESCRIPTION OF THE DRAWINGS

FIG. 2 is a diagram illustrating another example of a configuration of a lens apparatus.

FIGS. 3A and 3B are diagrams illustrating examples of a Fresnel zone plate.

FIGS. 8A and 8B are diagrams illustrating lens data of each example.

FIG. 9 is a diagram illustrating an aspheric coefficient of Example 1.

FIGS. 10A to 10D are diagrams illustrating longitudinal aberration of Example 1.

FIGS. 11A to 11D are diagrams illustrating longitudinal aberration of Example 2.

FIG. 12 is a diagram illustrating specifications of the examples.

FIG. 13 is a table showing an edge part light quantity calculation condition of Example 1.

DESCRIPTION OF THE PREFERRED EMBODIMENTS

Hereinafter, an imaging apparatus according to an embodiment of the present invention will be described in detail with reference to the appended drawings.

First Embodiment

Configuration of Imaging Apparatus

Figure 1:
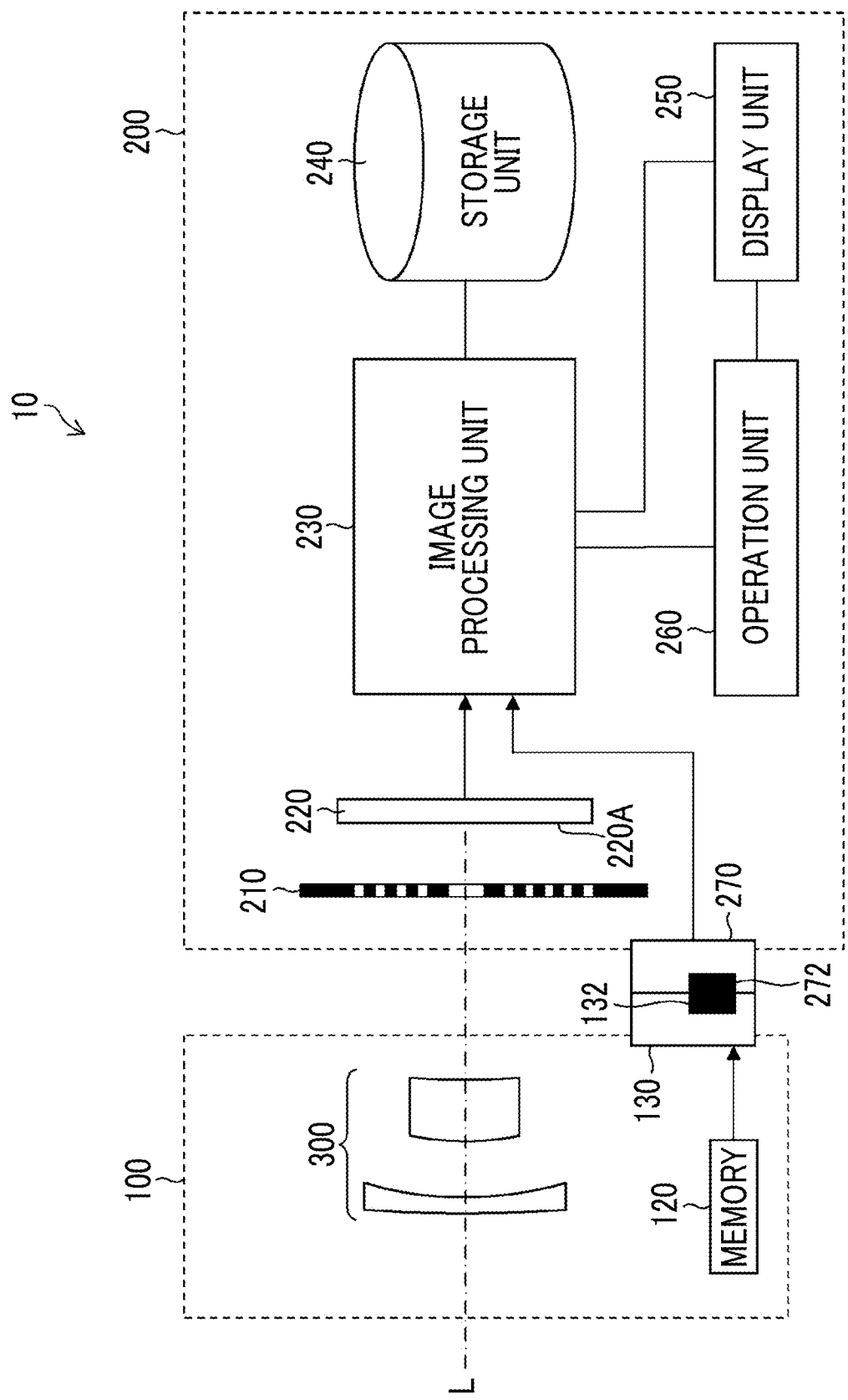
FIG. 1 is a block diagram illustrating a configuration of an imaging apparatus according to a first embodiment.

FIG. 1 is a block diagram illustrating a configuration of an imaging apparatus 10 (imaging apparatus) according to a first embodiment. The imaging apparatus 10 comprises a lens apparatus 100 (a lens or an interchangeable lens) and an imaging apparatus main body 200 (imaging apparatus main body). The imaging apparatus 10 can be applied to not only a digital camera but also a smartphone, a tablet terminal, a monitoring camera, an inspection camera, and the like. However, an application target of the imaging apparatus 10 is not limited to these apparatuses.

Configuration of Lens Apparatus

The lens apparatus 100 comprises a lens 300 (a lens or an interchangeable lens). The lens 300 is a lens (wide conversion lens) that increases an imaging angle of view from a state where the lens 300 is not mounted by mounting (on a subject side from a Fresnel zone plate 210) the lens 300 on the imaging apparatus main body 200. The lens apparatus 100 is mounted (attached) on the imaging apparatus main body 200 through a lens side mount 130 and a main body side mount 270 (lens attachment unit; lens attachment port). In a case where the lens apparatus 100 is mounted on the imaging apparatus main body 200, a lens side terminal 132 comes into contact with a main body side terminal 272, and communication between the lens apparatus 100 and the imaging apparatus main body 200 is enabled. A memory 120 (lens information storage unit) stores information about the lens 300. The stored information is acquired by an instruction from an image processing unit 230. For example, a lens configuration, a focal length, an imaging angle of view, an F number, a type and a value of aberration, and the like of the lens 300 can be stored in the memory 120. These information may be stored in the memory 120 by measurement after manufacturing of the lens 300 (lens apparatus 100), or design values may be stored. In addition, information input by operating an operation unit 260 may be used.

The lens apparatus 100 can be attached to or detached from the imaging apparatus main body 200 by operation performed by a user. Accordingly, lenses having different angles of view or focal lengths can be mounted depending on an imaging purpose, an imaging condition, and the like, and imaging can be performed under a desired condition. For example, instead of the lens apparatus 100, a lens apparatus 102 (refer to FIG. 2) including a lens 400 can be mounted on the imaging apparatus main body 200. The lens 400 is a lens (tele conversion lens) that decreases the imaging angle of view from a state where the lens 400 is not mounted by mounting the lens 400 on the imaging apparatus main body 200. In FIG. 1 and FIG. 2, the configurations of the lenses 300 and 400 are displayed in a simplified manner. Specific configurations of the lenses 300 and 400 will be described later. In addition, while a case where the lens apparatuses 100 and 102 are mounted on the imaging apparatus main body 200 through the lens side mount 130 and the main body side mount 270 has been described with FIG. 1, mounting on the imaging apparatus main body 200 is not limited to such an aspect. Besides, for example, mounting may be performed using a screw thread (lens attachment unit; lens attachment port) disposed in one of the lens apparatuses 100 and 102, and the imaging apparatus main body 200 and a screw groove (lens attachment unit; lens attachment port) that is disposed in the other and corresponds to the screw thread. The lenses 300 and 400 are attached on the subject side (object side) from the Fresnel zone plate 210.

Configuration of Imaging Apparatus Main Body

The imaging apparatus main body 200 comprises the Fresnel zone plate 210 (a Fresnel zone plate or a coded aperture) and an imaging element 220 (imaging element). A projected image formed by causing light from a subject to be transmitted through the Fresnel zone plate 210 and the lens 300 (or the lens 400) is acquired by the imaging element 220. The Fresnel zone plate 210 is arranged on an imaging surface side of the imaging element 220 in a state where the center of the Fresnel zone plate 210 matches the center of the imaging element 220 and the Fresnel zone plate 210 is parallel to an imaging surface 220A (light-receiving surface) of the imaging element 220. The Fresnel zone plate 210 may be interchangeable with respect to the imaging apparatus main body 200. By differentiating the use of Fresnel zone plates having different characteristics (a size, a pitch, a phase, a distance to an image sensor, and the like), the characteristics (an angle of view, a depth (distance measurement accuracy), and the like) of the acquired projected image can be controlled, and an image having desired characteristics can be reconstructed. In the following description, the Fresnel zone plate may be referred to as the "FZP".

Configuration of Fresnel Zone Plate

FIG. 3A is a diagram illustrating an FZP1 that is an example of the Fresnel zone plate 210. In the FZP1, the transmittance of incident light continuously changes in accordance with a pattern of the FZP1 depending on a distance from the center. A region (transmission region) that is more similar to white has a higher transmittance of light. A region (light blocking region) that is more similar to black has a lower transmittance of light. The transmission region and the light blocking region are alternately arranged in the concentric shape as a whole. The transmission regions and the light blocking regions constitute the Fresnel zone plate. The interval between concentric circles is decreased from the center to the edge part of the FZP1. Such a pattern (change in local spatial frequency) of the shape of concentric circles is represented by Expressions (2), (3), and (7) and the like described later. The detail of the concentric circles in these expressions is referred to as a "pitch". The pitch is determined by the value of β. In a case where β is small, the pattern is coarse. In a case where β is large, the pattern is detailed. A memory may be disposed in the imaging apparatus main body 200, and information about the pitch (value of β) may be stored in the memory. The image processing unit 230 (information acquisition unit 230E) may acquire and use the information.

An optical axis L (refer to FIG. 1) of the Fresnel zone plate 210 is an axis that passes through the centers of the FZP and the imaging element 220 and is perpendicular to the FZP and the imaging surface 220A of the imaging element 220. The FZP is arranged near the imaging element 220. The projected image may be blurred by diffraction of light depending on a distance to the imaging element 220. Thus, it is preferable that the FZP is not excessively away from the imaging element 220.

FIG. 3B is a diagram illustrating an FZP2 that is another example of the Fresnel zone plate. In the FZP2, a threshold value is set for the transmittance of the pattern of the FZP1. A region in which the transmittance exceeds the threshold value is the transmission region (white part) having a transmittance of 100%. A region in which the transmittance is less than or equal to the threshold value is the light blocking region (black part) having a transmittance of 0%. The transmittance non-continuously (in two levels of 0% and 100%) changes depending on the distance from the center. The transmission region and the light blocking region are alternately arranged in the concentric shape as a whole. The transmission regions and the light blocking regions constitute the Fresnel zone plate. The "Fresnel zone plate" according to the embodiment of the present invention includes an aspect such as the FZP1 and an aspect such as the FZP2. Accordingly, a "Fresnel zone pattern" according to the embodiment of the present invention includes a pattern in which the transmittance continuously changes and a pattern in which the transmittance non-continuously changes. A light blocking unit (a region in which light is not transmitted like the light blocking region) may be disposed in the edge part portion of the Fresnel zone plate illustrated in FIGS. 3A and 3B, and incidence of unnecessary light on the edge part portion of the imaging element 220 may be prevented.

Configuration of Imaging Element

The imaging element 220 is an image sensor that includes a plurality of pixels configured with photoelectric conversion elements arranged in two-dimensional directions. Light condensing efficiency may be increased by disposing a microlens in each pixel. In addition, a color image may be reconstructed by arranging a color filter (for example, red, blue, and green) in each pixel. In this case, an interpolation process corresponding to the arrangement pattern of the color filters is performed in the acquisition of the projected image like a demosaicing process (referred to as demosaicing) in color image generation in a typical digital camera. By the interpolation process, a signal of a color insufficient in each pixel (light-receiving element) is generated, and a signal of each color (for example, red, blue, and green) is obtained in all pixels. Such a process can be performed by the image processing unit 230.

The imaging apparatus main body 200 comprises the image processing unit 230, a storage unit 240, a display unit 250, and the operation unit 260 in addition to the Fresnel zone plate 210 and the imaging element 220 and performs image restoration and the like of the subject based on the Fresnel zone plate 210 and the projected image acquired by the imaging element 220.

Configuration of Image Processing Unit

Figure 4:
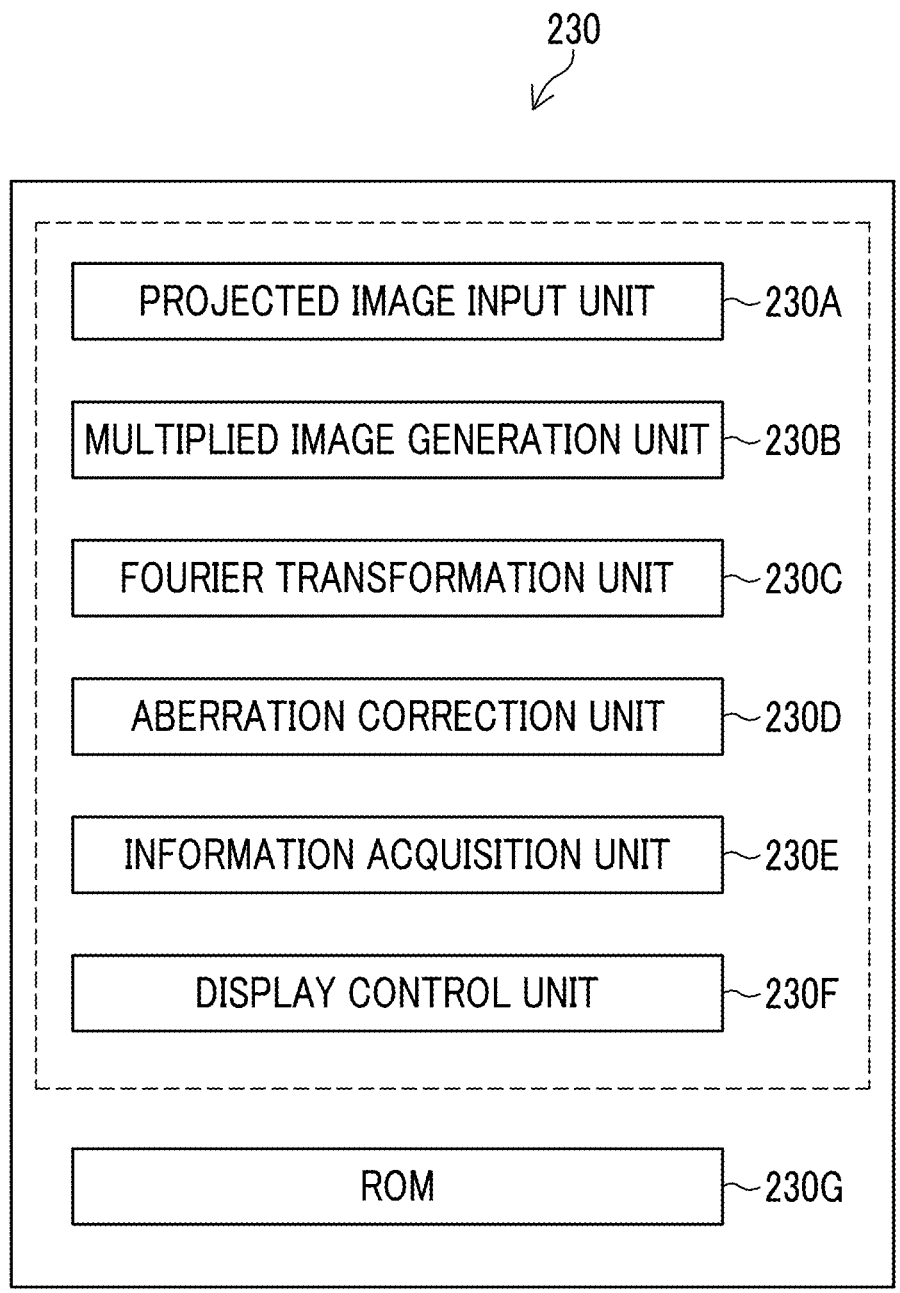
FIG. 4 is a block diagram illustrating a configuration of a processing unit.

FIG. 4 is a diagram illustrating a configuration of the image processing unit 230 (image restoration unit; image restoration processor). The image processing unit 230 includes a projected image input unit 230A, a multiplied image generation unit 230B (image restoration unit), a Fourier transformation unit 230C (image restoration unit), an aberration correction unit 230D (image restoration unit), the information acquisition unit 230E (lens information acquisition unit; lens information acquisition processor), and a display control unit 230F. The projected image input unit 230A controls the imaging element 220 to acquire, from the imaging element 220, the projected image formed in the imaging element 220 by causing the light from the subject to be incident on the FZP. The multiplied image generation unit 230B generates a complex image composed of an image of a real part and an image of an imaginary part by multiplying the projected image with a plurality of Fresnel zone patterns (first and second Fresnel zone patterns) that have the same local spatial frequency and have different phases of the local spatial frequency. The Fourier transformation unit 230C reconstructs an image of a spatial domain by performing two-dimensional complex Fourier transformation on the complex image. The aberration correction unit 230D corrects aberration (astigmatism, spherical aberration, coma aberration, distortion, axial chromatic aberration, lateral chromatic aberration, and the like) caused by the lens 300 or the lens 400 in the image of the spatial domain. The information acquisition unit 230E acquires information (for example, a lens configuration, a focal length, an imaging angle of view, an F number, a type and a value of aberration, and the like) of the lens 300 stored in the memory 120 of the lens apparatus 100. In addition, the information acquisition unit 230E acquires information (information about the pitch) of the Fresnel zone plate 210 used in acquisition of the projected image. The display control unit 230F controls display of the projected image, the complex image, the reconstructed image, and the like on the display unit 250. Computer (processor)-readable codes of various programs such as a program performing reconstruction of the image for operating the imaging apparatus 10 are recorded in a ROM 230G (non-transitory recording medium).

The function of the image processing unit 230 can be implemented using various processors. For example, the various processors include a central processing unit (CPU) that is a general-purpose processor implementing various functions by executing software (program). In addition, the various processors include a programmable logic device (PLD) that is a processor such as a field programmable gate array (FPGA) of which the circuit configuration can be changed after manufacturing. Furthermore, the various processors include a dedicated electric circuit or the like that is a processor such as an application specific integrated circuit (ASIC) having a circuit configuration dedicatedly designed to execute a specific process.

The function of each unit may be implemented by one processor or may be implemented by combining a plurality of processors. In addition, a plurality of functions may be implemented by one processor. As an example of configuring a plurality of functions with one processor, a first form is configuring one processor with a combination of one or more CPUs and software and implementing a plurality of functions by the processor as represented by a computer such as a client and a server. A second form is using a processor that implements the function of the whole system by one integrated circuit (IC) chip as represented by a system on chip (SoC) and the like. Various functions are configured using one or more of the various processors as a hardware structure.

Furthermore, the hardware structure of the various processors is more specifically an electric circuit (circuitry) in which circuit elements such as semiconductor elements are combined.

In execution of software (program) by the processor (or the electric circuit), a computer-readable code of the software to be executed is stored in a non-transitory recording medium such as the ROM 230G and the processor refers to the software. In a process using the software, for example, a random access memory (RAM) is used as a temporary storage region. In addition, for example, data stored in an electronically erasable and programmable read only memory (EEPROM) is referred to. In FIG. 4, illustrations of devices such as the RAM and the EEPROM are omitted.

Configuration of Storage Unit

Figure 5:
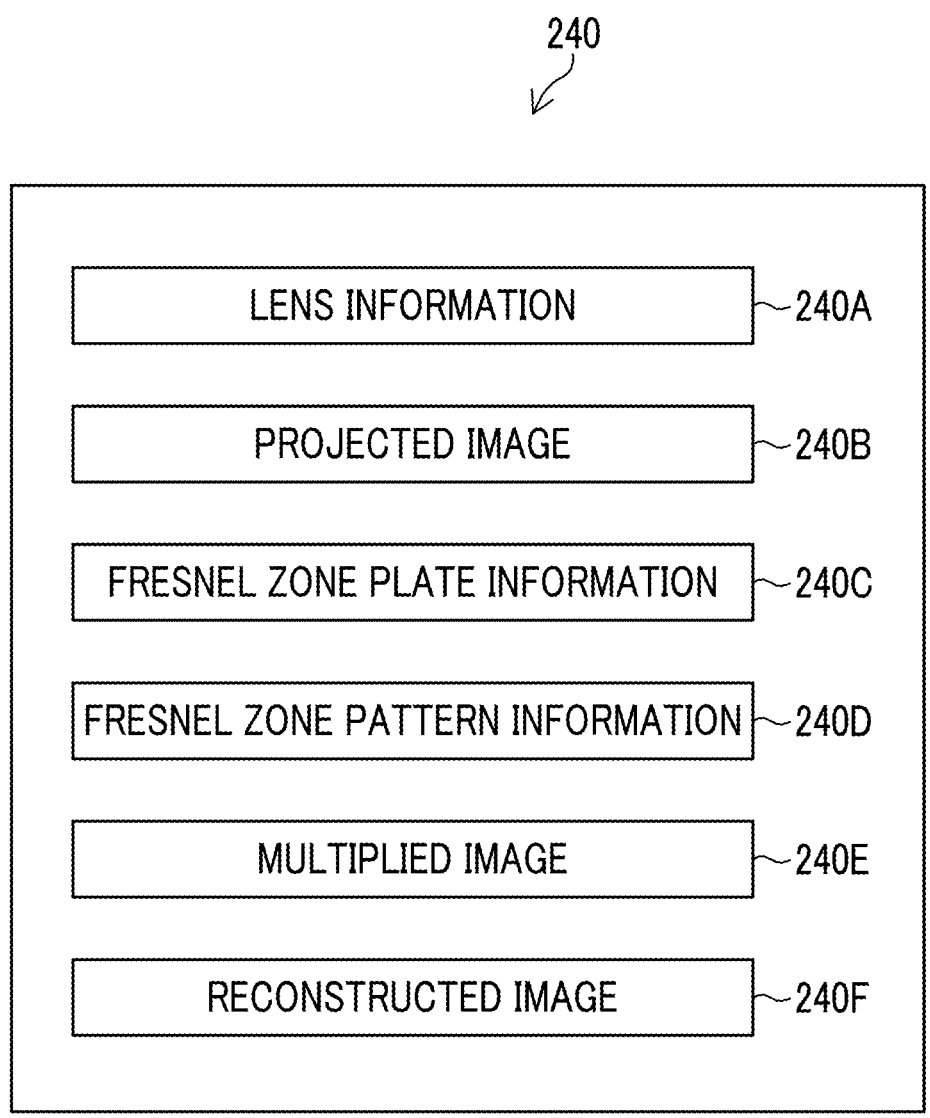
FIG. 5 is a diagram illustrating information stored in a storage unit.

The storage unit 240 is configured with a non-transitory recording medium such as a compact disk (CD), a digital versatile disk (DVD), a hard disk, and various semiconductor memories. The storage unit 240 stores images and information illustrated in FIG. 5 in association with each other. Lens information 240A is information (for example, a lens configuration, a focal length, an imaging angle of view, an F value, a type and a value of aberration, and the like) of the lens 300 acquired from the lens apparatus 100. A projected image 240B is the projected image acquired from the imaging element 220. Fresnel zone plate information 240C is information (including pitch information such as the value of β) of the local spatial frequency of the Fresnel zone plate 210. The Fresnel zone plate information 240C may be information acquired from the imaging element 220 or may be information input through the operation unit 260. Fresnel zone pattern information 240D is information indicating the Fresnel zone pattern and is preferably recorded for a plurality of Fresnel zone patterns having different phases of the local spatial frequency. A multiplied image 240E is a complex image that is composed of the image of the real part and the image of the imaginary part and is obtained by multiplying the projected image with the Fresnel zone patterns (first and second Fresnel zone patterns) indicated by the Fresnel zone pattern information 240D. A reconstructed image 240F is the image of the spatial domain obtained by performing two-dimensional complex Fourier transformation on the multiplied image 240E.

Configurations of Display Unit and Operation Unit

The display unit 250 is configured to include a display apparatus such as a liquid crystal display, not illustrated. The display unit 250 displays the projected image, the multiplied image, the reconstructed image, and the like and is also used for displaying a user interface (UI) screen at the time of an instruction input through the operation unit 260. The operation unit 260 is configured with devices such as a keyboard, a mouse, a button, and a switch, not illustrated. Using these devices, the user can input a projected image acquisition instruction, an image reconstruction instruction, a focusing distance condition, information (the pitch and the phase) of the local spatial frequency, and the like. The display apparatus of the display unit 250 may be configured with a touch panel and may be used as the operation unit 260 in addition to the image display.

Specific Configuration of Lens

Example 1

Figure 6A:
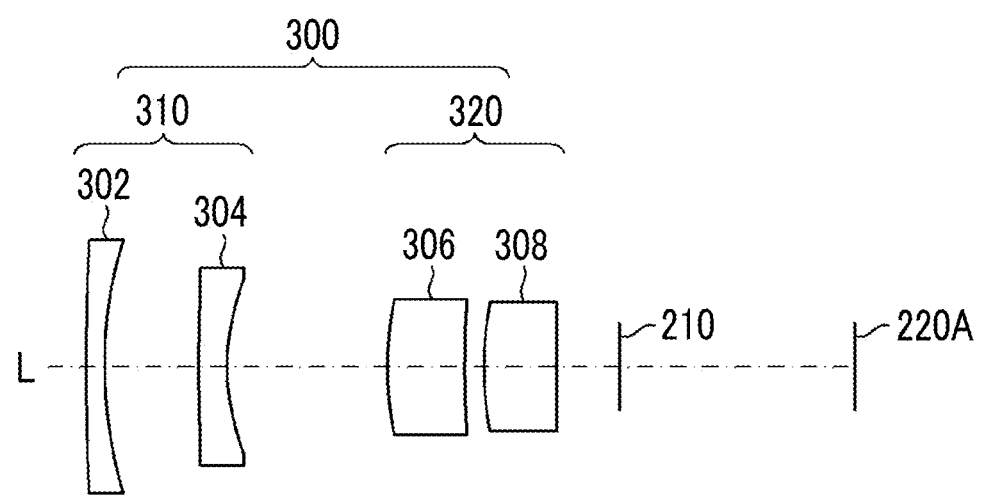
FIGS. 6A and 6B are diagrams illustrating a lens configuration of an example.

FIG. 6A is a diagram illustrating arrangement of the lens 300, the Fresnel zone plate 210, and the imaging surface 220A of the imaging element 220. The lens 300 is a wide conversion lens composed of a front group 310 having a negative power (refractive power; the same applies hereinafter) and a rear group 320 having a positive power in order from the object side (subject side) and is composed of lenses 302, 304, 306, and 308. The Fresnel zone plate 210 is arranged at the position of a pupil (position of a stop) of the lens 300.

Example 2

Figure 6B:
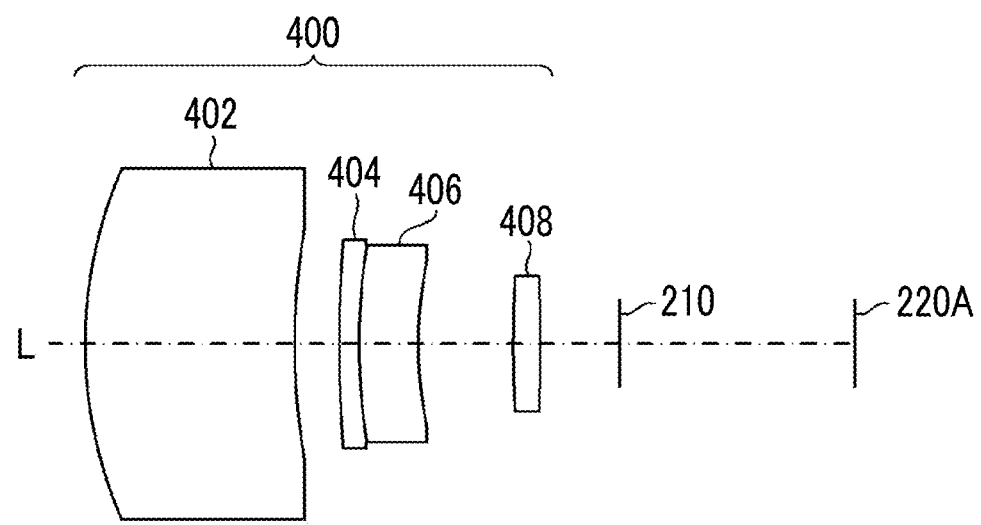

FIG. 6B is a diagram illustrating arrangement of the lens 400, the Fresnel zone plate 210, and the imaging surface 220A of the imaging element 220. The lens 400 is a tele conversion lens and is composed of lenses 402, 404, 406, and 408. The Fresnel zone plate 210 is arranged at the position of a pupil (position of a stop) of the lens 400.

The angles of view of the lenses 300 and 400 are fixed. However, the lens attached to the imaging apparatus main body in the imaging apparatus according to the embodiment of the present invention may be a zoom lens capable of changing the angle of view (focal length).

Optical Path Diagram

Figure 7A:
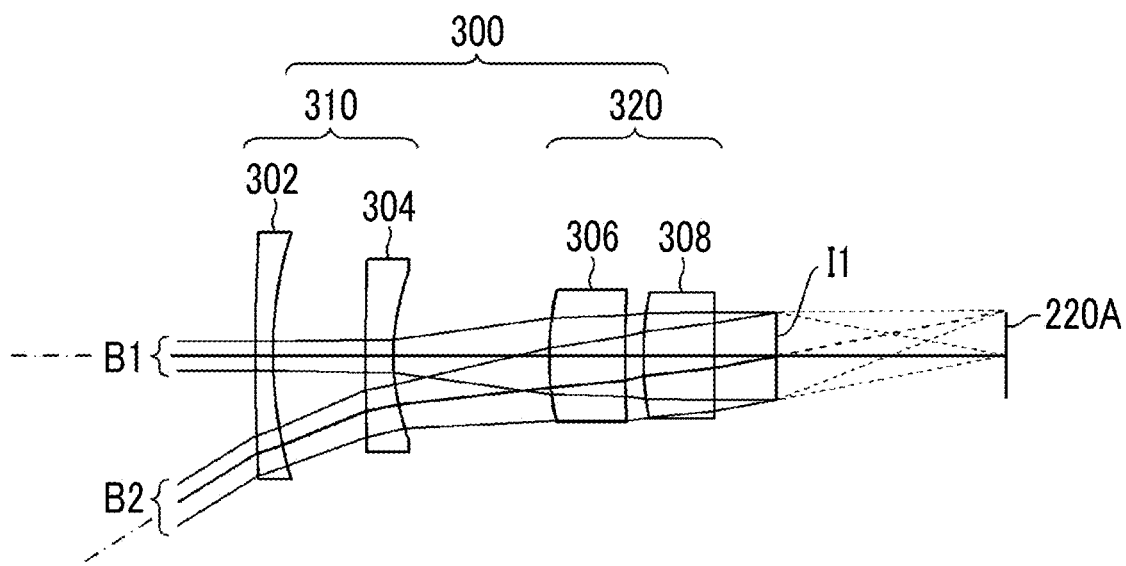
FIGS. 7A and 7B are diagrams illustrating an optical path of each example.
Figure 7B:
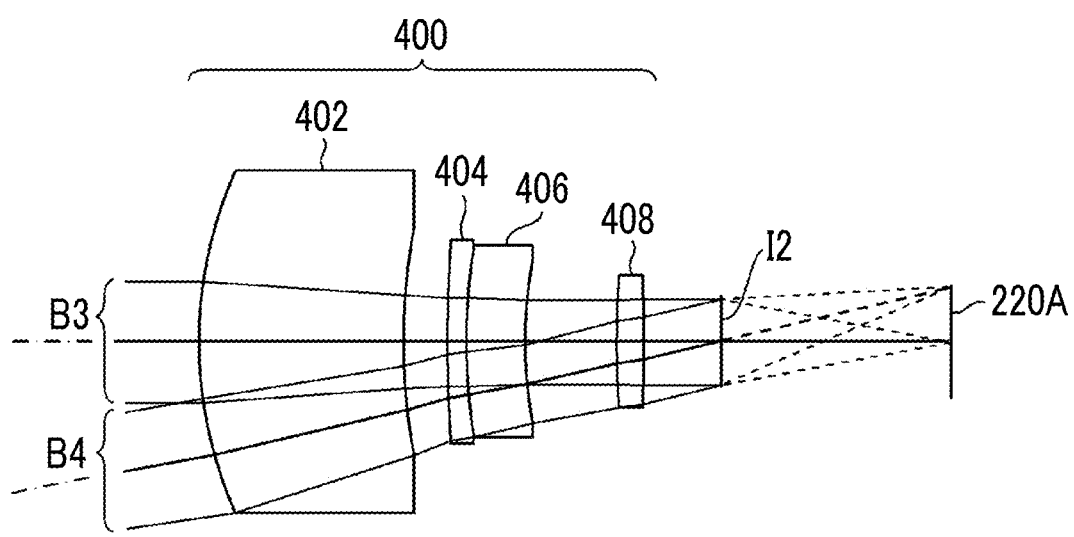
Figure 10A:
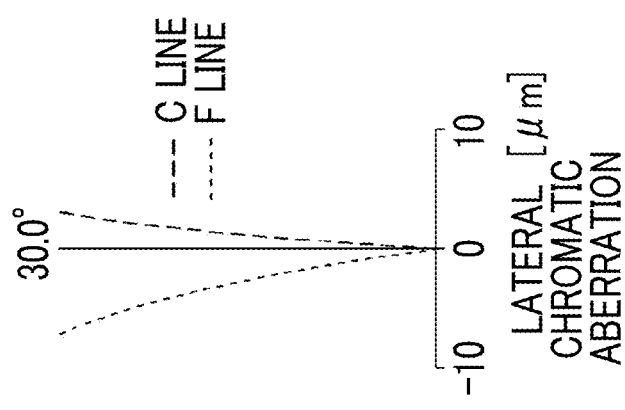
Figure 10C:
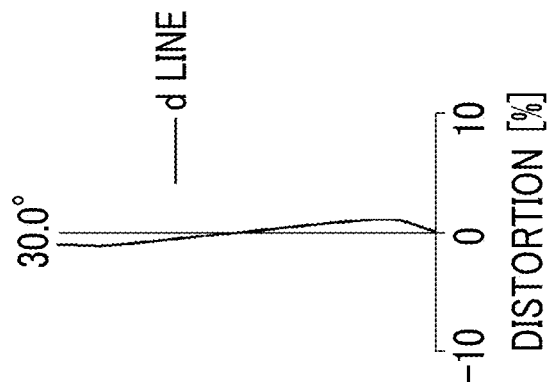
Figure 10D:
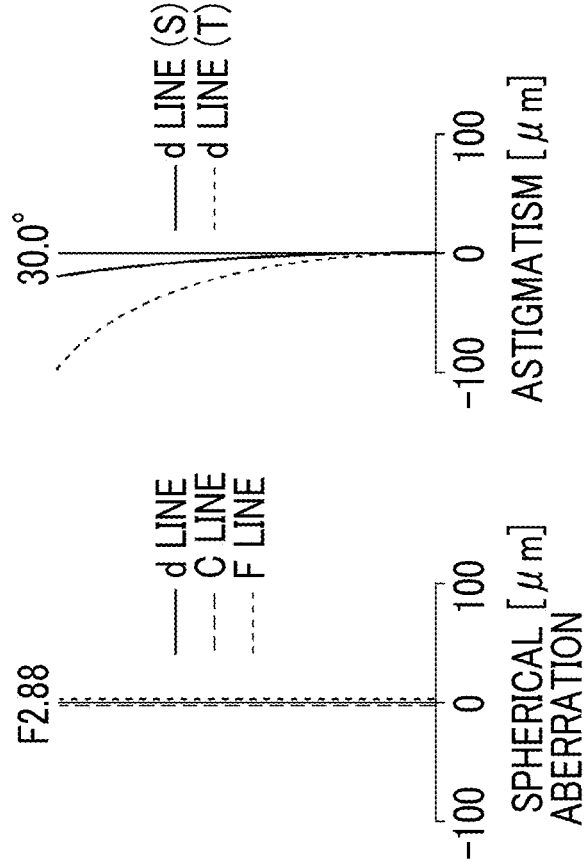

FIG. 7A is a diagram illustrating the optical paths of an axial luminous flux B1 and a luminous flux B2 having the maximum angle of view with respect to the lens 300 in a state where an ideal lens I1 (lens having zero aberration) is arranged at the position of the pupil of the lens 300. In actuality, the Fresnel zone plate 210 is arranged at the position of the ideal lens I1, and the luminous flux travels as a wavefront. Thus, the optical path of a dotted line part is not achieved after the Fresnel zone plate 210 (imaging element 220 side). However, the optical path in a case where the ideal lens I1 is arranged is illustrated for reference. Similarly, FIG. 7B is a diagram illustrating the optical paths of an axial luminous flux B3 and a luminous flux B4 having the maximum angle of view with respect to the lens 400 in a state where an ideal lens I2 (lens having zero aberration) is arranged at the position of the pupil of the lens 400. In actuality, the Fresnel zone plate 210 is arranged at the position of the ideal lens I2, and the luminous flux travels as a wavefront. Thus, the optical path of a dotted line part is not achieved after the Fresnel zone plate 210 (imaging element 220 side). However, the optical path in a case where the ideal lens I2 is arranged is illustrated for reference. The characteristics of the ideal lenses I1 and I2 are f=1 mm, IH=9.407, FNo.=2.88, and 2ω=41.2 deg. Lens data of the ideal lenses I1 and I2 is data in a case where the interval between the pupil and the imaging surface 220A is normalized to 1 mm (that is, the interval between the ideal lens I1 or I2 and the imaging surface 220A is 1 mm). Here, mm denotes millimeter, and deg denotes angle.

Lens Data

FIG. 8A is a table showing the lens data of the lens 300. In the table, a surface having a surface number with "*" indicates an aspheric surface. Similarly, FIG. 8B is a table showing the lens data of the lens 400. The lens data in FIGS. 8A and 8B is data in a case where the interval between the pupil and the imaging surface 220A is normalized to 1 mm (that is, the interval between the Fresnel zone plate 210 and the imaging surface 220A is 1 mm). In a case where the interval becomes k times by a change in focal length and the like, a radius of curvature and a surface interval also become k times.

FIG. 9 is a table showing an aspheric coefficient for the lens 300. In a case where the center of a lens surface is set as an origin and an optical axis is an x axis, the aspheric shape of the lens surface is represented by Expression (1) below. Here, c is the reciprocal of a paraxial radius of curvature (paraxial curvature), hi is a height from the optical axis, κ is a conic multiplier, and Ai is the spherical coefficient.

$$x = \frac{ch^2}{1 + \sqrt{1 - \kappa c^2 h^2}} + \Sigma A_i h^i \quad (1)$$

Longitudinal Aberration Diagram

FIGS. 10A to 10D are diagrams illustrating spherical aberration, astigmatism, distortion, and lateral chromatic aberration of the lens 300, respectively. Similarly, FIGS. 11A to 11D are diagrams illustrating spherical aberration, astigmatism, distortion, and lateral chromatic aberration of the lens 400, respectively.

Specifications of Example

FIG. 12 is a table showing the specifications of Examples 1 and 2. According to the above configuration, in Example 1 (in the case of mounting the lens 300), it is perceived that the angle of view is changed (increased to 60.0 deg) with respect to an original optical system (angle of view is 20.6 deg). Similarly, in Example 2 (in the case of mounting the lens 400), it is perceived that the angle of view is changed (decreased to 17.8 deg) with respect to the original optical system (angle of view is 24.8 deg). The "original optical system" in Examples 1 and 2 is an optical system (focal length is 1.0 mm) using a coded aperture such as the Fresnel zone plate 210.

Edge Part Light Quantity

Figure 14A:
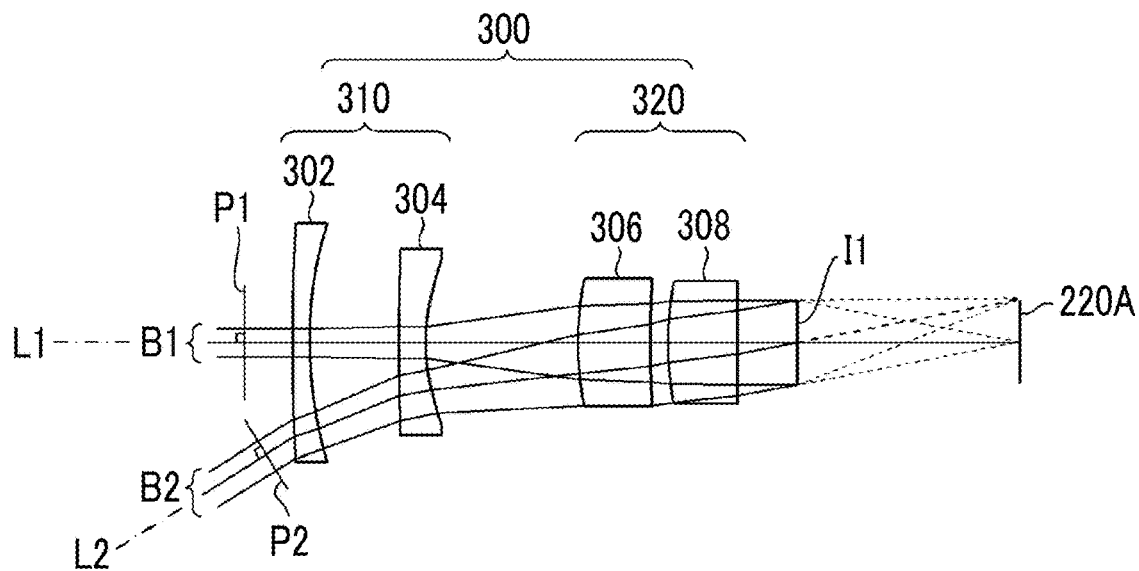
FIGS. 14A to 14C are diagrams illustrating definitions of parameters.
Figure 14B:
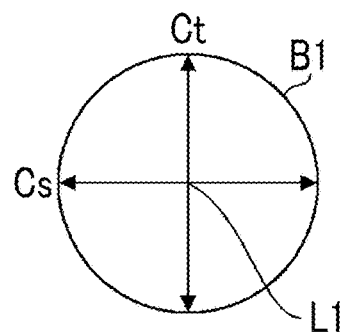
Figure 14C:
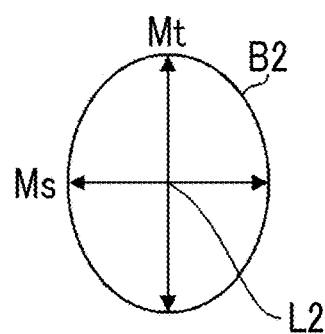

FIG. 13 is a table showing a conditional expression for calculation of an edge part light quantity for Example 1. The meanings of parameters in the table are as follows. The definitions of Cs, Ct, Mt, and Ms are illustrated in FIGS. 14A, 14B, and 14C. FIG. 14B is a diagram illustrating a plane P1, and FIG. 14C is a diagram illustrating a plane P2. The planes P1 and P2 are planes perpendicular to a principal ray L1 of the axial luminous flux B1 and a principal ray L2 of the luminous flux B2 having the maximum angle of view, respectively.

Cs: length of axial luminous flux incident on surface closest to object side in sagittal direction (tangential direction)

Ms: length of luminous flux having maximum angle of view and incident on surface closest to object side in sagittal direction DA: maximum air interval in wide conversion lens (lens 300)

Ff: focal length of lens group on object side from DA

Ct: length of axial luminous flux incident on surface closest to object side in tangential direction (radial direction)

Figure 15:
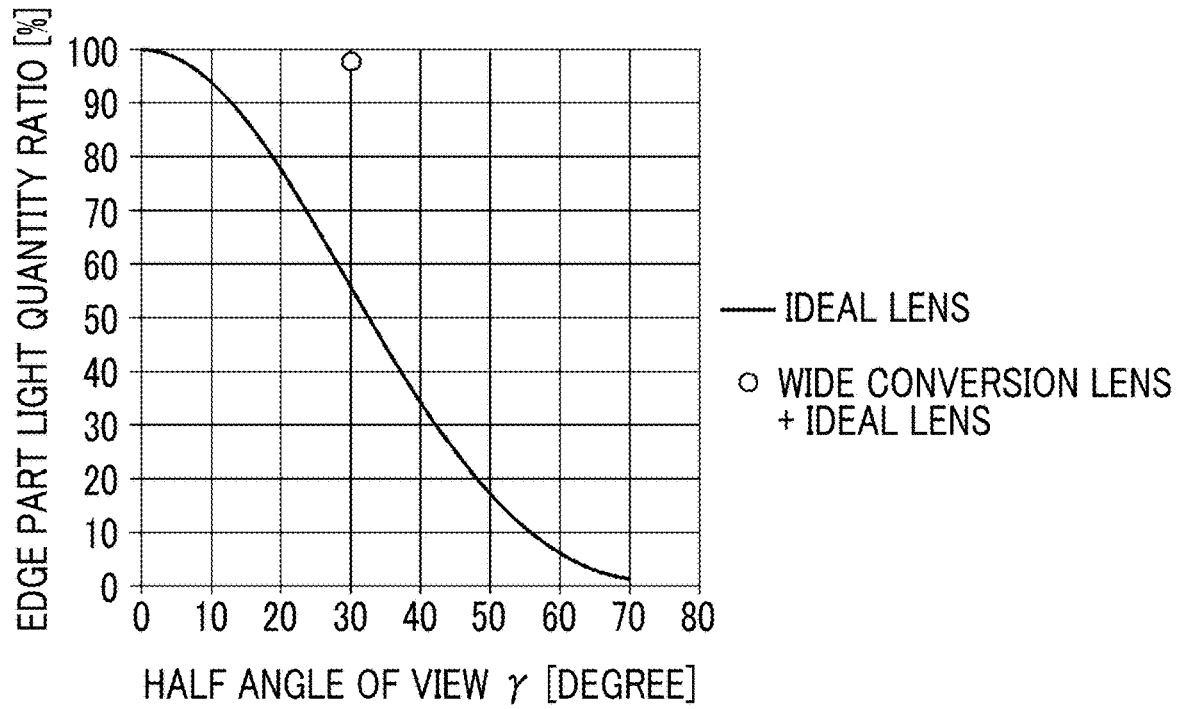
FIG. 15 is a graph showing edge part light quantity ratios of an ideal lens and Example 1.

Mt: length when length of luminous flux having maximum angle of view and incident on surface closest to object side in tangential direction is projected to surface perpendicular to principal ray WCTL: length from first surface to last surface of wide conversion lens WCf: focal length of wide conversion lens Dist: optical distortion when wide conversion lens is mounted on ideal lens FIG. 15 is a graph showing an edge part light quantity ratio (100% on the optical axis; represented by the fourth power of (cos γ) with respect to a half angle of view γ) for the ideal lens and (wide conversion lens (lens 300)+ideal lens) in Example 1. In a case where the half angle of view γ is 30 deg, the edge part light quantity ratio of the ideal lens is approximately 56%. In the case of (wide conversion lens+ideal lens), the edge part light quantity ratio is approximately 98%, and it is perceived that the edge part light quantity ratio is improved.

Reconstruction of Image

Figure 16:
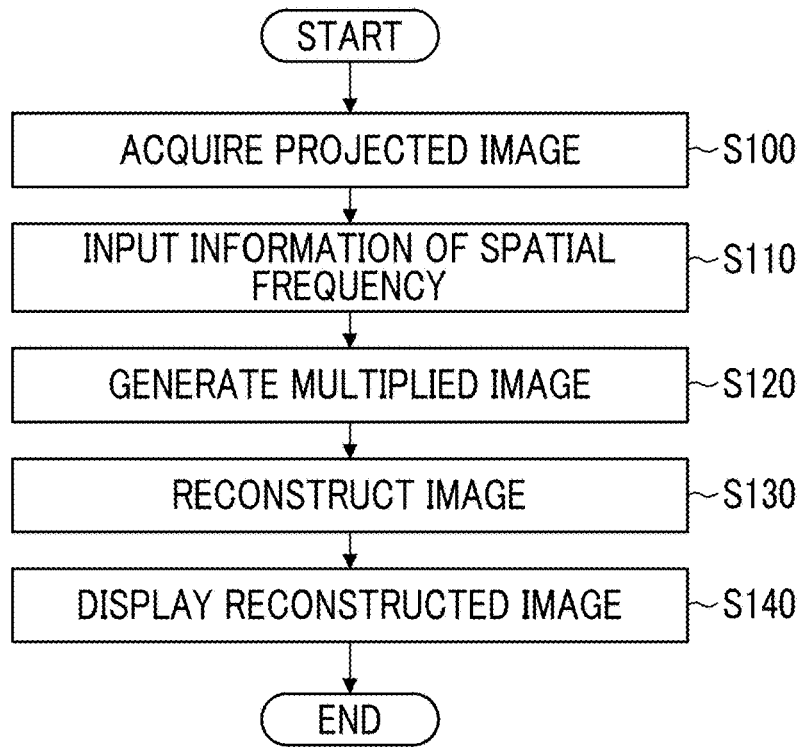
FIG. 16 is a flowchart illustrating a process of image reconstruction.

Reconstruction of the image performed by the imaging apparatus 10 having the above configuration will be described. FIG. 16 is a flowchart illustrating a reconstruction process of the image.

Input of Projected Image

In step S100, the image processing unit 230 (projected image input unit 230A) acquires the projected image of the subject from the imaging element 220. The acquired projected image is the projected image formed in the imaging element 220 by causing the light from the subject to be incident on the Fresnel zone plate 210.

Information about Local Spatial Frequency

In step S110, the image processing unit 230 (information acquisition unit 230E) inputs information (pitch of the Fresnel zone plate 210) of the local spatial frequency of the Fresnel zone plate 210 used in the acquisition of the projected image. This information may be input from a memory, not illustrated, or may be input in accordance with operation of the operation unit 260 performed by the user. In addition, the projected image acquired in step S100 may be analyzed and input by the information acquisition unit 230E. The pitch is determined by the value of $\beta$ (refer to Expressions (2), (4), and (7) and the like described later). Thus, the value of $\beta$ may be specifically input. In the case of imaging a known subject (for example, a point light source at infinite distance), the pitch (value of $\beta$) can be acquired by analyzing the captured image. In addition, a value with which a clear image is obtained may be obtained by repeating the reconstruction of the image by changing the pitch (value of $\beta$).

Generation of Complex Image

In step S120, the image processing unit 230 (multiplied image generation unit 230B) generates the complex image composed of the image of the real part and the image of the imaginary part by multiplying the projected image with each of the first and second Fresnel zone patterns. As the Fresnel zone patterns multiplied in step S120, patterns that are selected from the patterns (Fresnel zone pattern information 240D) stored in the storage unit 240 in accordance with the pitch (value of $\beta$) input in step S110 can be used. In addition, patterns to which the patterns stored in the storage unit 240 are changed (magnified or reduced as necessary) in accordance with the pitch (value of $\beta$) can be used. The image processing unit 230 (multiplied image generation unit 230B) stores the generated complex image in the storage unit 240 as the multiplied image 240E.

Phase of Fresnel Zone Pattern

Figure 17A:
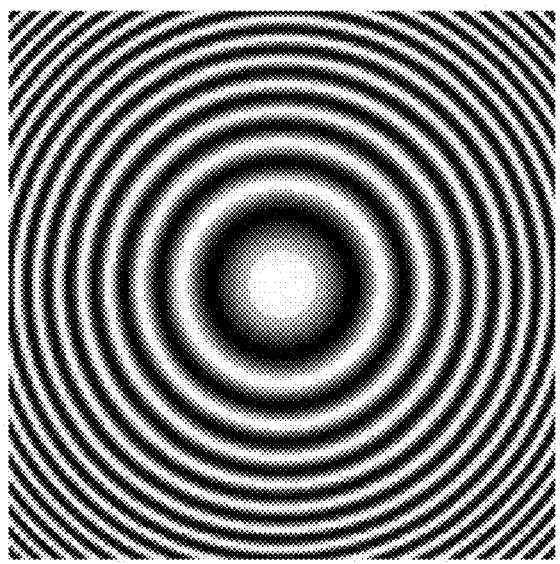
FIGS. 17A and 17B are diagrams illustrating examples of Fresnel zone plates having different phases.
Figure 17B:
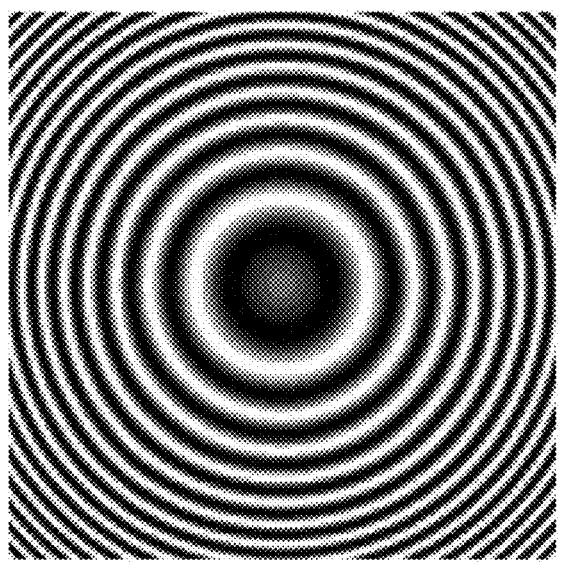

For example, the first Fresnel zone pattern used in restoration of the image can be set as the pattern (phase at the center is 0 deg) illustrated in FIG. 17A. The image of the real part is obtained by multiplying the projected image with the first Fresnel zone pattern. In addition, for example, the second Fresnel zone pattern can be set as the pattern (has the same pitch and has a phase shifted by 90 deg with respect to the first Fresnel zone pattern) illustrated in FIG. 17B. The image of the imaginary part is obtained by multiplying the projected image with the second Fresnel zone pattern. As described above, for Expression (7) and the like, it is preferable that the shift in phase between the first and second Fresnel zone patterns is 90 deg. However, as long as the shift in phase is in a positive or negative range of greater than or equal to 70 deg and less than or equal to 110 deg, a clear image can be reconstructed. The phase of the local spatial frequency of the first Fresnel zone pattern or the second Fresnel zone pattern may be the same as the phase of the Fresnel zone plate 210.

In using the Fresnel zone pattern, data of a plurality of Fresnel zone patterns having different phases may be stored in the storage unit 240 as the Fresnel zone pattern information 240D, and a desired pattern can be selected and used. Alternatively, the image processing unit 230 (multiplied image generation unit 230B) may generate a desired pattern based on information about the pitch and the phase. Since the Fresnel zone patterns are stored in the storage unit 240 as the Fresnel zone pattern information 240D that is electronic data, selection and generation of a desired pattern can be quickly and easily performed. In addition, problems such as an increase in size of the apparatus and an increase in manufacturing cost caused by maintaining plates (substrates) corresponding to a plurality of patterns as tangible objects and deterioration of image quality caused by variations (including variations at the time of manufacturing, a temporal change, and a change in temperature) of characteristics between the plurality of patterns do not arise.

Magnification Ratio of Fresnel Zone Pattern

Figure 18:
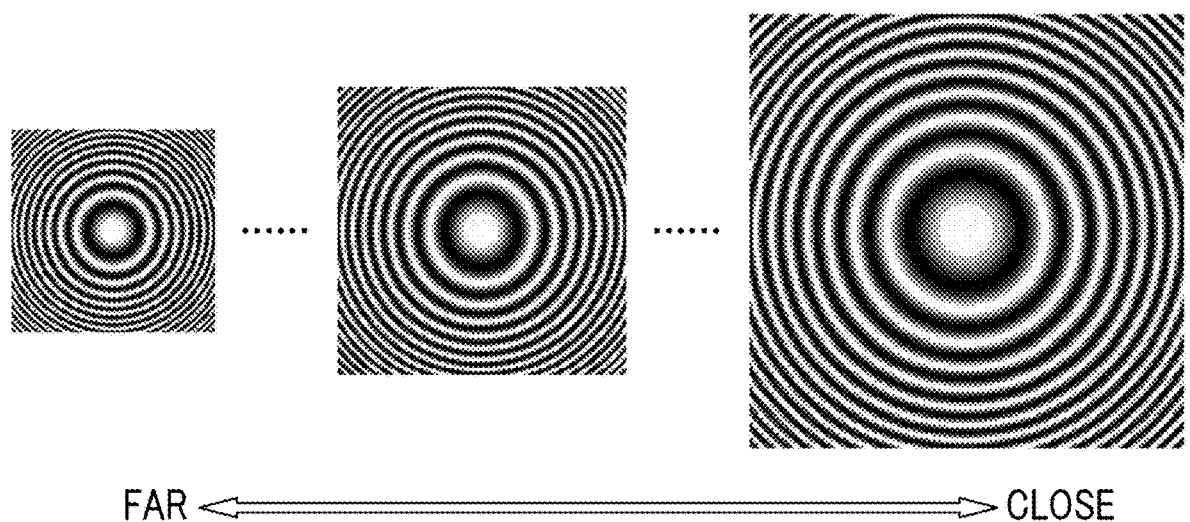
FIG. 18 is a diagram illustrating a Fresnel zone pattern having a magnification ratio corresponding to a focusing distance.

In a case where the subject (light source) is present at infinity, parallel light is incident on the Fresnel zone plate 210, and the projected image formed in the imaging element 220 has the same size as the Fresnel zone plate 210. However, in a case where the subject is present at a finite distance, light that spreads is incident, and the projected image is increased as the distance is decreased. Accordingly, an image that is focused to a desired distance can be obtained using patterns having different magnification ratios as the first and second Fresnel zone patterns depending on a subject distance to be focused. For example, a plurality of patterns corresponding to the subject distance can be stored in the storage unit 240 as the Fresnel zone pattern information 240D and used by reading out the plurality of patterns. In addition, one Fresnel zone pattern may be stored as a reference pattern and may be magnified at different magnification ratios depending on the subject distance. In this case, a pattern that corresponds to the infinite subject distance and has the same size as the Fresnel zone plate can be set as the reference pattern. FIG. 18 is a diagram illustrating a state where the magnification ratio of the Fresnel zone pattern varies depending on the subject distance.

A clear image may be acquired by repeating the generation of the complex image (step S120) and the reconstruction of the image (step S130) while changing the magnification ratio and maximizing a focusing evaluation value (for example, the integral value of a brightness signal in a focus evaluation region set in the image) of the reconstructed image.

The imaging apparatus 10 according to the first embodiment can perform refocusing using the Fresnel zone plate 210 (coded aperture) and the Fresnel zone patterns.

Reconstruction of Image

In step S130, the image processing unit 230 (Fourier transformation unit 230C) reconstructs the image of the subject (image of the spatial domain) by performing two-dimensional complex Fourier transformation on the complex image (described later). Furthermore, the image processing unit 230 (aberration correction unit 230D) corrects aberration (spherical aberration, coma aberration, distortion, axial chromatic aberration, lateral chromatic aberration, and the like) caused by the lens (lens 300 and the lens 400) mounted on the imaging apparatus main body 200 in the reconstructed image (image of the spatial domain). The correction is performed based on the lens information 240A acquired from the memory 120. The correction of the aberration may be performed before reconstructing the image or may be performed after reconstruction. In the case of correcting the aberration before reconstruction, for example, the correction may be performed by changing the shape and/or the size of the Fresnel zone pattern (coded aperture) to be multiplied with the projected image depending on the type and/or the amount of aberration to be corrected. Meanwhile, in the case of correcting the aberration after reconstruction, for example, the correction can be performed by performing image processing such as applying different filters (filters for point image restoration and the like) depending on the type and/or the degree of aberration to be corrected and a condition such as a position in the image. However, the correction of the aberration in the present invention is not limited to such an aspect. The image processing unit 230 (display control unit 230F) displays the reconstructed image on the display unit 250 (step S140). In addition, the image processing unit 230 (Fourier transformation unit 230C) stores the reconstructed image in the storage unit 240 as the reconstructed image 240F.

Details of Image Restoration

Details of image restoration in the first embodiment will be described in further detail. A pattern I(r) of the coded aperture (Fresnel zone plate) is represented by Expression (2).

$$I(r) = \cos \beta r^2 \quad (2)$$

As the value of I(r) is increased, the transmittance of light in a predetermined wavelength range is increased. The radius of the Fresnel zone plate is denoted by r. A constant determining the detail (pitch) of the pattern is denoted by $\beta$ (>0). Hereinafter, in order to avoid a negative value, I2(r) that falls in a range of 0 to 1 by applying an offset as in Expression (3) will be considered.

$$I2(r) = \tfrac{1}{2}(1 + \cos \beta r^2) \quad (3)$$

It is assumed that the coded aperture (Fresnel zone plate) is arranged away from a sensor surface of the imaging element by a distance d. At this point, in a case where it is assumed that light (parallel light) is incident at an incidence angle $\theta$ from the point light source at infinite distance, a shadow of the coded aperture (Fresnel zone plate) is translated by $\Delta r (= d \times \tan \theta)$ and is casted on the sensor. A translated shadow S(r) is represented by Expression (4).

$$S(r) = I2(r - \Delta r) = \tfrac{1}{2}\{1 + \cos \beta (r - \Delta r)^2\} \quad (4)$$

I2(r) and S(r) are originally two-dimensional images and are functions of two variables. However, for simplification, only one-dimensional image on a cross section cut by a plane including the center and the incidence light source will be mainly considered. The one-dimensional image can be easily extended to a two-dimensional case in a case where calculation is performed as in Expression (5) below.

$$r = \sqrt{x^2 + y^2} \quad (5)$$

A captured shadow image (projected image) is subjected to image restoration (reconstruction) in a computer and is output. In an image restoration process, the shadow image is multiplied with a Fresnel zone aperture image (Fresnel zone pattern) that is not positionally shifted. For this function of interior multiplication, a case of two functions represented by Expressions (6) and (7) below will be considered. An imaginary unit is denoted by j.

$$Mr(r) = I(r) = \cos \beta r^2 \quad (6)$$

$$Mc(r) = e^{j\beta r^2} \quad (7)$$

Mr(r) is the same real number function as I(r) except that an offset (direct current component) is removed in Mr(r). Reconstruction of the image in the technology of the related art ("Development of lensless camera technology enabling easy focus adjustment after motion picture imaging", [online], Nov. 15, 2016, Hitachi, Ltd., [searched on May 8, 2017], Internet (http://www.hitachi.co.jp/New/cnews/month/2016/11/1115.html) and "Lensless Light-field Imaging with Fresnel Zone Aperture", Technical Report of The Institute of Image Information and Television Engineers, vol. 40, no. 40, IST2016-51, pp. 7-8, November 2016 and WO2016/203573A) corresponds to a case of multiplying the projected image of a real number aperture with the Fresnel zone pattern represented by the real number function Mr(r). Mc(r) is a complex number function, and $Mc(r) = \cos \beta r^2 + j \times \sin \beta r^2 = \cos \beta r^2 - j \times \cos (\beta r^2 + \pi/2)$ is established. Thus, the real part and the imaginary part correspond to Fresnel zone patterns of which the phases are shifted by $(\pi/2)$, that is, 90 deg. The real part $(\cos \beta r^2)$ of Mc(r) is the same as Mr(r). In the first embodiment, the complex image composed of the image of the real part and the image of the imaginary part is generated by multiplying the projected image with two Fresnel zone patterns (first and second Fresnel zone patterns) of different phases corresponding to the real part and the imaginary part of the complex number function, respectively.

The image (multiplied image) after interior multiplication in each case is represented by Expressions (8) and (9).

$$Fr(r) = S(r)Mr(r) = I(r - \Delta r) \cos \beta r^2 = \tfrac{1}{2} \cos \beta r^2 + \tfrac{1}{2} \cos \beta (r - \Delta r)^2 \cos \beta r^2 = \tfrac{1}{2} \cos \beta r^2 + \tfrac{1}{4} \cos \beta (-2r\Delta r + \Delta r^2) + \tfrac{1}{4} \cos \beta (2r^2 - 2r\Delta r + \Delta r^2) \quad (8)$$

$$Fc(r) = S(r)Mc(r) = I(r - \Delta r) e^{j\beta r^2} = \tfrac{1}{2} e^{j\beta r^2} + \tfrac{1}{4}(e^{j\beta (r-\Delta r)^2} + e^{-j\beta (r-\Delta r)^2}) e^{j\beta r^2} = \tfrac{1}{2} e^{j\beta r^2} + \tfrac{1}{4} e^{j\beta (2r\Delta r - \Delta r^2)} + \tfrac{1}{4} e^{j\beta (2r^2 - 2r\Delta r + \Delta r^2)} \quad (9)$$

In each of post-multiplication images Fr(r) and Fc(r) corresponding to the cases of using Mr(r) and Mc(r) in the image of interior multiplication, the first term is a component that can be removed by offset correction and the like. The second term is a moire interference fringe from which a "frequency of difference" (corresponds to $\cos (\alpha - \varphi)$ in a case where two apertures are represented by $\cos \alpha$ and $\cos \varphi$) between superimposed Fresnel zone apertures is extracted, and matches the basis of Fourier transformation. Thus, the second term is a component that is transformed into a delta function and changed into a "point" by applying Fourier transformation and contributes to image formation. The third term corresponds to a "frequency of sum" (corresponds to $\cos (\alpha + \varphi)$) and is a component that does not contribute to image formation and acts as a noise even in a case where Fourier transformation is performed.

Images in a state where the first term is removed by appropriately applying offset correction to Fr(r) and Fc(r) are denoted by Fr2(r) and Fc2(r). In a case where Fourier transformation is actually applied to these images, Fourier transformation of Fr(r) and Fc(r) is denoted by fr(k) and fc(k) and is represented by Expressions (10) and (11).

$$fr(k) = \mathcal{F}[Fr2(r)] \\ = \tfrac{1}{4} e^{j\beta \Delta r^2} \delta(k - 2\beta \Delta r) + \tfrac{1}{4} e^{-j\beta \Delta r^2} \delta(k + 2\beta \Delta r) + \tfrac{1}{8\sqrt{\beta}} e^{-j\pi/4} \cos \xi(k, \beta, \Delta r) \quad (10)$$

$$fc(k) = \mathcal{F}[Fc2(r)] = \tfrac{1}{4} e^{-j\beta \Delta r^2} \delta(k - 2\beta \Delta r) + \tfrac{1}{8\sqrt{\beta}} e^{-j\{\tfrac{\pi}{4} - \xi(k, \beta, \Delta r)\}} \quad (11)$$

Here, $\xi(k, \beta, \Delta r)$ is a real number polynomial. Restored images are obtained by taking the absolute value of a complex number in these expressions. However, in the case of fr(k) (in the case of the technology of the related art), the first term and the second term generate two points that are symmetric about the origin. Thus, the restored image is duplicate with point symmetry. In the case of fc(k) (in the case of the first embodiment), an image is normally reconstructed without posing such a problem. A common point in both cases is that the third term of fr(r) and the second term of fc(r) act as a noise. Due to these terms, a modulation transfer function (MTF) cannot be 100%, and this means that the MTF cannot be 100% even in a case where a noise caused by the sensor is not present). However, this noise is decreased in a case where the value of $\beta$ is increased. Thus, an effect can be reduced by increasing the value of $\beta$ (making the pattern more detailed).

A phase rotates depending on the incidence angle of light. However, in a case where the absolute value of the complex number is taken with respect to the first term of fc(k) (in the case of the first embodiment), it can be confirmed that an image is formed as a delta function (point) in correspondence with arrival of light from infinity. Since the whole calculation of an angular spectrum of the incidence ray to the formed image is linear, superimposition is established. Accordingly, the formation of the image can be described.

In a case where calculation is performed for the two-dimensional case, the edge part light quantity is the fourth power of $(\cos \gamma)$, and distortion is $2 \times \beta \times d \times \tan \gamma$. Here, $\gamma$ denotes the half angle of view.

Effect of First Embodiment

As described above, the imaging apparatus 10 according to the first embodiment has the refocusing function provided by the coded aperture and can change the angle of view.

Other Aspects

In the first embodiment, the complex image is generated by multiplying the projected image with the first and second Fresnel zone patterns, and the image of the spatial domain is reconstructed by performing complex Fourier transformation on the complex image. However, the reconstruction of the image in the imaging apparatus according to the embodiment of the present invention is not limited to an aspect of using the complex image. As described above for Expressions (6), (8), and (10) and the like, the multiplied image may be obtained by multiplying the projected image with a real number function such as Mr(r), and the image may be reconstructed by performing Fourier transformation on the multiplied image. In this case, an overlap of the subject image occurs in the restored image. However, the overlap can be handled by, for example, displaying the reconstructed image by cutting the reconstructed image in half. Even in the case of multiplying the real number function, an image focused to a desired distance can be obtained using Fresnel zone patterns having different magnification ratios depending on the subject distance to be focused.

While the embodiment of the present invention has been described above, the present invention is not limited to the embodiment and can be subjected to various modifications without departing from the spirit of the present invention.

EXPLANATION OF REFERENCES

10: imaging apparatus
100, 102: lens apparatus
120: memory
130: lens side mount
132: lens side terminal
200: imaging apparatus main body
210, FZP1, FZP2: Fresnel zone plate
220: imaging element
220A: imaging surface
230: image processing unit
230A: projected image input unit
230B: multiplied image generation unit
230C: Fourier transformation unit
230D: aberration correction unit
230E: information acquisition unit
230F: display control unit
230G: ROM
240: storage unit
240A: lens information
240B: projected image
240C: Fresnel zone plate information
240D: Fresnel zone pattern information
240E: multiplied image
240F: reconstructed image
250: display unit
260: operation unit
270: main body side mount
272: main body side terminal
300, 302, 304, 306, 308, 400, 402, 404, 406, 408: lens
310: front group
320: rear group
B1, B3: axial luminous flux
B2, B4: luminous flux
Fr: post-multiplication image
I: pattern
I1, I2: ideal lens
L: optical axis
L1, L2: principal ray
Mr: real number function
P1, P2: plane
S100 to S140: each step of reconstruction process
γ: half angle of view
θ: incidence angle

What is claimed is:

1. An imaging apparatus comprising:
an imaging apparatus main body including a coded aperture, an imaging element that outputs a signal indicating a projected image of a subject, and an image restoration processor that is configured to reconstruct an image of a spatial domain based on the signal; and
a lens that is attached to the imaging apparatus main body on a subject side from the coded aperture and changes an imaging angle of view in a state where the lens is attached to the imaging apparatus main body with respect to an imaging angle of view in a state where the lens is not attached to the imaging apparatus main body,
wherein the coded aperture is arranged at the position of a pupil of the lens,
wherein the projected image is formed on the imaging element by causing light from the subject to be transmitted through the lens and the coded aperture, and
wherein the coded aperture is a Fresnel zone plate, and
the image restoration processor generates a multiplied image by multiplying the projected image formed on the imaging element by the Fresnel zone plate with a Fresnel zone pattern corresponding to the Fresnel zone plate and reconstructs the image of the spatial domain by performing Fourier transformation on the multiplied image, wherein the Fresnel zone pattern includes a first Fresnel zone pattern and a second Fresnel zone pattern that has a same local spatial frequency in each region as the first Fresnel zone pattern and has a phase shifted by a range of 70 degree to 100 degree with respect to a phase of the first Fresnel zone pattern.

2. The imaging apparatus according to claim 1, wherein the lens is a lens that does not decrease an edge part light quantity in a state where the lens is attached to the imaging apparatus main body below an edge part light quantity in a state where the lens is not attached to the imaging apparatus main body.

3. The imaging apparatus according to claim 1, wherein the lens is a lens that increases the imaging angle of view in a state where the lens is attached to the imaging apparatus main body above the imaging angle of view in a state where the lens is not attached to the imaging apparatus main body.

4. The imaging apparatus according to claim 2, wherein the lens is a lens that increases the imaging angle of view in a state where the lens is attached to the imaging apparatus main body above the imaging angle of view in a state where the lens is not attached to the imaging apparatus main body.

5. The imaging apparatus according to claim 1, wherein the lens is a lens that decreases the imaging angle of view in a state where the lens is attached to the imaging apparatus main body below the imaging angle of view in a state where the lens is not attached to the imaging apparatus main body.

6. The imaging apparatus according to claim 1, wherein the lens is an interchangeable lens that is attached to or detached from the imaging apparatus main body.

7. The imaging apparatus according to claim 2, wherein the lens is an interchangeable lens that is attached to or detached from the imaging apparatus main body.

8. The imaging apparatus according to claim 3, wherein the lens is an interchangeable lens that is attached to or detached from the imaging apparatus main body.

9. The imaging apparatus according to claim 4, wherein the lens is an interchangeable lens that is attached to or detached from the imaging apparatus main body.

10. The imaging apparatus according to claim 5, wherein the lens is an interchangeable lens that is attached to or detached from the imaging apparatus main body.

11. The imaging apparatus according to claim 1, wherein the imaging apparatus main body includes a lens attachment port to which the lens is attached on the subject side from the coded aperture.

12. The imaging apparatus according to claim 2, wherein the imaging apparatus main body includes a lens attachment port to which the lens is attached on the subject side from the coded aperture.

13. The imaging apparatus according to claim 3, wherein the imaging apparatus main body includes a lens attachment port to which the lens is attached on the subject side from the coded aperture.

14. The imaging apparatus according to claim 4, wherein the imaging apparatus main body includes a lens attachment port to which the lens is attached on the subject side from the coded aperture.

15. The imaging apparatus according to claim 1, wherein the image restoration processor corrects aberration caused by the lens in the image of the spatial domain.

16. The imaging apparatus according to claim 15, further comprising:
a lens information acquisition processor that is configured to acquire information about the lens,
wherein the image restoration processor corrects the aberration based on the acquired information.

17. The imaging apparatus according to claim 1, wherein the image restoration processor generates a complex image composed of an image of a real part and an image of an imaginary part as the multiplied image by multiplying the projected image with each of the first Fresnel zone pattern and the second Fresnel zone pattern and reconstructs the image of the spatial domain by performing two-dimensional complex Fourier transformation on the complex image.

18. The imaging apparatus according to claim 17, wherein the image restoration processor generates the complex image by using the first Fresnel zone pattern and the second Fresnel zone pattern having different magnification ratios depending on a subject distance to be focused.

19. An imaging apparatus main body comprising:
a coded aperture;
an imaging element that outputs a signal indicating a projected image of a subject projected by causing light from the subject to be transmitted through the coded aperture; and
an image restoration processor that is configured to reconstruct an image of a spatial domain based on the signal,
wherein the imaging apparatus main body includes a lens attachment port to which a lens is attached on a subject side from the coded aperture, and a lens information acquisition processor that is configured to acquire lens information about the lens,
wherein the coded aperture is arranged at the position of a pupil of the lens,
wherein the image restoration processor corrects aberration caused by the lens in the image of the spatial domain, and
wherein the coded aperture is a Fresnel zone plate, and the image restoration processor generates a multiplied image by multiplying the projected image formed on the imaging element by the Fresnel zone plate with a Fresnel zone pattern corresponding to the Fresnel zone plate and reconstructs the image of the spatial domain by performing Fourier transformation on the multiplied image,
wherein the Fresnel zone pattern includes a first Fresnel zone pattern and a second Fresnel zone pattern that has a same local spatial frequency in each region as the first Fresnel zone pattern and has a phase shifted by a range of 70 degree to 100 degree with respect to a phase of the first Fresnel zone pattern.

* * * * *